United States Patent [19]

Griffin et al.

[11] Patent Number: 5,606,612

[45] Date of Patent: Feb. 25, 1997

[54] METHOD AND APPARATUS FOR TELEVISION SIGNAL SCRAMBLING USING A LINE EXPANSION TECHNIQUE

[75] Inventors: John T. Griffin; David Grubb, III; Jeffrey S. Hamilton, all of Doylestown, Pa.

[73] Assignee: General Instrument Corporation, Jerrold Communications Division, Hatboro, Pa.

[21] Appl. No.: 279,514

[22] Filed: Jul. 25, 1994

[51] Int. Cl.⁶ ........................... H04N 7/167
[52] U.S. Cl. ................. 380/14; 380/10; 380/15; 380/20; 380/49
[58] Field of Search ............... 380/10, 14, 15, 380/20, 49

[56] References Cited

U.S. PATENT DOCUMENTS

| | | | |
|---|---|---|---|
| 3,683,111 | 8/1972 | Southworth | 348/424 |
| 4,340,906 | 7/1982 | den Toonder et al. | 380/17 |
| 4,376,957 | 3/1983 | Dischert et al. | 358/334 |
| 4,389,671 | 6/1983 | Posner et al. | 380/11 |
| 4,390,899 | 6/1983 | Osaka et al. | 380/15 |
| 4,405,942 | 9/1983 | Block et al. | 380/14 |
| 4,527,195 | 7/1985 | Cheung | 380/15 |
| 4,563,702 | 1/1986 | Heller et al. | 380/14 X |
| 4,580,173 | 4/1986 | Dischert et al. | 358/310 |
| 4,600,942 | 7/1986 | Field et al. | 380/15 |
| 4,605,961 | 8/1986 | Frederiksen | 380/14 |

(List continued on next page.)

FOREIGN PATENT DOCUMENTS 60-256286 12/1985 Japan ........................ 380/14

OTHER PUBLICATIONS

NTC Report No. 7, Prepared by the Network Transmission Committee of the Video Transmission Engineering Advisory Committee, pp. 1–73, Revised Jan. 1976.

EIA Standard, Electrical Performance Standards for Television Relay Facilities, Engineering Department, Electronic Industries Association, Sep. 1976.

Moroney et al., "The Videocipher," *IEEE*, pp. 297–302 (1984).

Cypress Semiconductor, Spec Sheet, CYM1422, 128K48 Static RAM Module, pp. 2–271–2–276.

Analog Devices, Spec Sheet, Hybrid Video Digital–To–Analog Converter, HDG–0807, pp. 2–467–2–470, No Date.

Texas Instruments, Spec. Sheet, Advance Information Dynamic RAMs, TMS44C251 262,144 by 4–Bit Multiport Video RAM, pp. 4–79–4–81, 1988.

Datel, Inc., Spec. Sheet, ADC–303 8–Bit Video Flash A/D Converter, pp. 1–27–1–29 and 1–32, No Date.

*Primary Examiner*—Bernarr E. Gregory
*Attorney, Agent, or Firm*—Marshall, O'Toole, Gerstein, Murray & Borun

[57] ABSTRACT

A method and apparatus for scrambling an original analog video signal samples predetermined portions of the original video signal at a first rate and stores the sampled portions of the original video signal within a memory device. The stored video signal is read out of the memory device at a second rate, which is less than the first rate, to produce a time expanded scrambled video signal. A predetermined code is inserted into the time expanded scrambled video signal which is then converted into an analog scrambled video signal and transmitted through a channel. A method and apparatus for descrambling the scrambled video signal to produce a reconstructed video signal samples the scrambled video signal at the second rate, stores the sampled scrambled video signal into a memory and reads the sampled scrambled video signal out of the memory at the first rate. Replicas of the eliminated portions of the original video signal are reinserted into the sampled video signal to produce a digital version of the original video signal which is then converted to analog to produce the reconstructed video signal. The code word within the scrambled video signal is used to align each frame of the reconstructed video signal with the frame of the incoming scrambled video signal to keep the reconstructed video signal synchronized with the scrambled video signal.

37 Claims, 7 Drawing Sheets

U.S. PATENT DOCUMENTS

| | | | |
|---|---|---|---|
| 4,628,358 | 12/1986 | Robbins | 380/17 |
| 4,663,659 | 5/1987 | Blatter | 380/14 |
| 4,679,078 | 7/1987 | Wong et al. | 380/15 |
| 4,716,588 | 12/1987 | Thompson et al. | 380/20 |
| 4,723,282 | 2/1988 | Marie et al. | 380/14 |
| 4,731,839 | 3/1988 | Goray et al. | 380/14 |
| 4,736,420 | 4/1988 | Katznelson et al. | 380/14 X |
| 4,742,544 | 5/1988 | Kupnicki et al. | 380/14 |
| 4,742,546 | 5/1988 | Nishimura | 380/35 |
| 4,914,694 | 4/1990 | Leonard et al. | 380/5 |
| 4,916,736 | 4/1990 | Ryan | 380/11 |
| 4,924,498 | 5/1990 | Farmer et al. | 380/15 |
| 4,926,477 | 5/1990 | Paik | 380/15 |
| 5,014,310 | 5/1991 | Walker et al. | 380/10 |
| 5,321,748 | 6/1994 | Zeidler et al. | 380/14 |
| 5,410,601 | 4/1995 | Hashimoto | 380/14 |

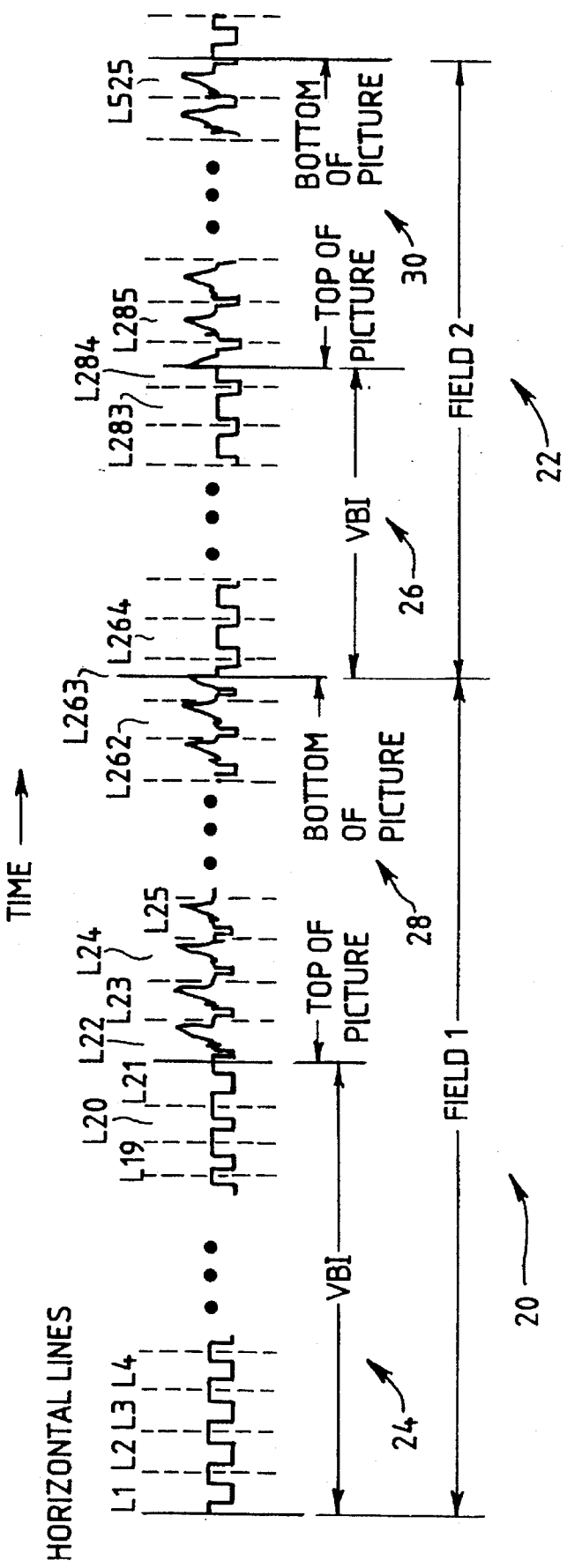

METHOD AND APPARATUS FOR TELEVISION SIGNAL SCRAMBLING USING A LINE EXPANSION TECHNIQUE

TECHNICAL FIELD

The present invention relates generally to encoding and decoding of video information, and more particularly to a method and apparatus which secures the transmission of video signals so that only authorized persons can view or have access to the associated video information.

BACKGROUND ART

Various systems have been proposed and are in use for scrambling television video signals to secure transmission of video information. Generally, these systems include a scrambler which alters the video signals in a predetermined manner before the video signals are propagated through a video channel using, for example, an RF, microwave, cable or other video communications system. At the receiving end of the video system, a descrambler reverses the scrambling process to assemble the scrambled video signals into their original order, sequence or state so that they can be suitably displayed for viewing on a television screen. Of course, if a receiver does not contain a suitable descrambler, the displayed video signals will be generally unintelligible and the information therein will be masked.

Thompson, et al., U.S. Pat. No. 4,716,588, discloses a multimode video signal scrambling system controlled by a central computer facility which scrambles each field of a video signal using one or more of several techniques including adding extraneous and confusing synchronizing (sync) pulses onto the video signal, compressing the amplitude of the video signal, alternatively inverting horizontal lines of the video signal in time to reverse the sequence thereof, removing horizontal sync pulses from the video signal, adding false leading edge sync pulses to horizontal lines of a video signal and shifting the amplitude of the active video information within a video signal in a predetermined direction so that a television receiver does not register or lock onto the active video information.

Ryan, U.S. Pat. No. 4,916,736, discloses a video scrambling system which shifts active video information in time with respect to the horizontal sync pulse and the color burst signal within each horizontal line of the video signal. This system includes an analog-to-digital (A/D) converter which digitizes and stores the video signal in a memory and a digital-to-analog (D/A) converter which reads the video information out of the memory for transmission through a communications channel. A controller controls the sequence in which the information is read out of the memory and shifts the digitized active video information in time with respect to the horizontal sync pulse and the color burst signal in order to scramble the video signal.

Other methods of scrambling a video signal use time compression and expansion techniques. It is generally known, for example, to time compress or time expand a communications signal and, thereby, expand or compress the bandwidth of that communications signal, prior to the transmission of the signal through a channel. As an example, Nishimura, U.S. Pat. No. 4,742,546, discloses a voice communications system which alternatively subjects a voice signal to time compression and time expansion before delivering the voice signal to a transmitting antennae. A demodulating circuit descrambles the received voice signal by time compressing and/or time expanding the scrambled voice signal in a manner complimentary to the manner of scrambling.

Southworth, U.S. Pat. No. 3,683,111, discloses a system which compresses the bandwidth of a television signal prior to transmission. This system includes a television scan converter which uses high order sampling techniques to sample predetermined portions of a video signal to convert the video signal into a narrowband signal which can be transmitted through a narrowband channel. A receiver converts the narrowband signal back into a standard television signal for display on a television screen. This system is particularly adapted for the detection of moving objects in the field of a view of a camera and is particularly useful with, for example, television surveillance systems which transmit television signals through a narrowband channel such as a channel commonly associated with telephone lines. This system is considered inadequate for commercial video signal scrambling, however, because it samples only portions of the original television video signal and, therefore, loses important video information. Furthermore, this system does not provide the clarity and resolution required in standard commercial television systems.

Dischert, et al., U.S. Pat. No. 4,376,957, discloses a time-division multiplexing apparatus which sequentially transmits multiple time-compressed video signals through a single channel. This system stores video signals in first and second memories at a first data rate and reads the video signals out of the memories at a second and higher data rate to produce time-compressed, bandwidth-expanded television signals which are alternatively delivered to a transmitter for transmission through a single channel. A receiver separates the time-compressed video signals, stores them in memories at the higher data rate and reads them out of the memories at the lower data rate to produce the original video signals. This system is considered inadequate for scrambling commercial video signals, however, because it increases the required bandwidth of the channel and thereby decreases the number of channels possible in any bandwidth limited communications system. Furthermore, increasing the bandwidth of a channel in a commercial, free-propagating television transmission system is undesirable and/or unacceptable because the bandwidths of these channels are limited by law. Increasing the bandwidth of a transmission channel is also unacceptable in CATV systems which maximize the number of channels by forcing the bandwidth of each channel to be as narrow as possible.

SUMMARY OF THE INVENTION

The present invention provides a video scrambling system which uses a time expansion technique to scramble a video signal and to simultaneously compress the frequency bandwidth of the video signal thereby to increase the number of channels available in a single video communications system. The present invention also provides a video scrambling system which does not lose video information and which does not decrease or limit the resolution of the descrambled video signal.

According to one aspect of the present invention, an apparatus for scrambling a video signal having first and second components, wherein each component includes at least one time continuous signal element, includes an analog to digital converter which samples at least one of the components at a first rate to convert the component into a digital video signal and which stores the digital video signal in a digital memory, preferably comprising two random access memories, at the first rate. The digital video signal is read out of the digital memory at a second rate, which is less than the first rate, to produce a time expanded digital scrambled video signal which is converted by a digital to analog converter into an analog scrambled video signal at the second rate.

A detector may detect at least one of the components of the video signal and disable the analog to digital converter when the first component is present at the analog to digital converter so that the first component is eliminated from the digital video signal and, thereby, from the scrambled video signal.

Preferably, the scrambling apparatus eliminates the first six lines of each vertical blanking interval of the video signal and eliminates the front porch, horizontal sync pulse, breezeway and the back porch signals from each horizontal line having active video information in order to produce the scrambled video signal. Also preferably, the scrambling apparatus time expands the color burst signal and the active video signal portion of the video signal by a ratio of 6/5 to produce the scrambled video signal.

The scrambling apparatus may include a code generator which inserts a predetermined code into each frame of the scrambled video signal to enable a descrambler to sync up to the scrambled video signal and to replicate the video signal therefrom. The scrambling apparatus may also include a phase locked loop which is responsive to the color burst signal and which produces clock signals having frequencies at the first and second rates.

According to another aspect of the present invention, an apparatus descrambles a scrambled video signal to reconstruct an original video signal having first and second components, each of which includes at least one time continuous element, wherein the scrambled video signal is a version of the original video signal in which the first component has been eliminated and the second component has been time expanded. The apparatus includes an analog to digital converter which samples the scrambled video signal to produce a digital scrambled video signal. The digital scrambled video signal is read into a memory at a first rate and is read out of the memory at a second and higher rate to time compress the scrambled video signal and to produce a digital version of the second component of the original video signal. A digital to analog converter converts this digital version of the original video signal into an analog video signal while a generator inserts a replica of the first component into the digital video signal or into the analog video signal, output by the digital to analog converter, to produce a reconstructed video signal which is a substantial equivalent of the original video signal.

Preferably, the first and second rates are multiples of the frequency of the color burst signal within the original video signal and the first component includes one or more of a vertical blanking interval and a horizontal synchronizing signal. Furthermore, the second component may include a color burst signal and an active video signal.

Also preferably, the descrambling apparatus includes means for recognizing a predetermined code within the scrambled video signal and a circuit responsive to the code which aligns a frame of the reconstructed video signal with a frame of the scrambled video signal. A phase locked loop may be responsive to the color burst signal within the scrambled video signal to produce clock signals having frequencies equal to the first and second rates.

BRIEF DESCRIPTION OF THE DRAWINGS

FIG. 1 is a timing diagram representing a single frame of a typical television video signal;

DESCRIPTION OF THE PREFERRED EMBODIMENT

Figure 2A:
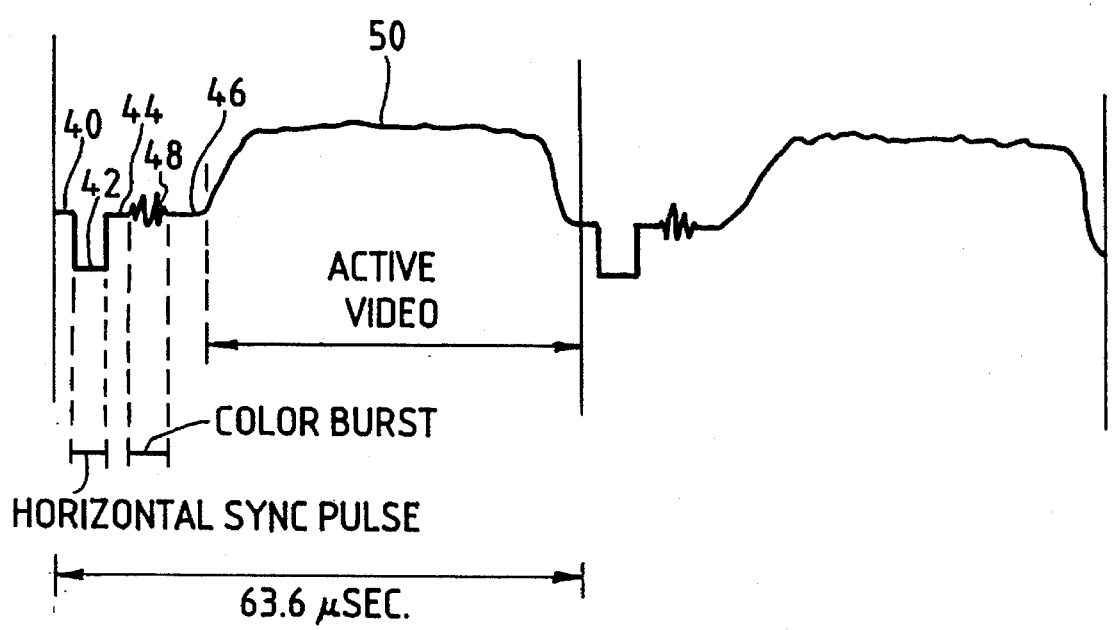
FIG. 2A is a timing diagram representing two horizontal lines of the video signal illustrated in FIG. 1.

Referring now to FIG. 1, a typical frame of a television video signal which may be developed and transmitted according to any standard including, for example, Electronics Industries Association (EIA) Standard RS-250-B or Network Transmission Committee Standard NTC-7 is illustrated. Typically, each frame includes 525 horizontal lines of video information (marked in FIG. 1 as L1, L2, etc.) and is divided into two fields 20 and 22, each of which includes 262½ horizontal lines of video information. Each of the fields 20 and 22 include a vertical blanking interval (VBI) 24 and 26, respectively, and an active video portion 28 and 30, respectively. Each of the VBIs 24 and 26 include twenty-one horizontal lines of flat field (black) video information which are not displayed on the television receiver. Typically one or more of the first ten horizontal lines of each of the VBIs 24 and 26 include standardized sets of equalizing pulses and/or vertical sync pulses which are used by a television to synchronize the television beam with the incoming video signal. The horizontal lines of the VBIs 24 and 26 may also include closed caption information, audio information, copyright information, scrambling codes and/or any other desired information.

Each of the active video portions 28 and 30 includes 241½ horizontal lines of video information having active video signals which are displayed consecutively downwardly on a television screen such that the first horizontal line of video information within each of the active video portions 28 and 30 is displayed at the top of the television screen and the last horizontal line of each of the active video portions 28 and 30 is displayed at the bottom of the television screen. Furthermore, the horizontal lines of the active video portions 28 and 30 are interleaved with each other so that, for example, horizontal line L285 is displayed directly below horizontal line L22 and directly above horizontal line L23. Furthermore, as indicated in FIG. 1, the horizontal lines of the active video portion 30 are offset from the horizontal lines of active video portion 28 by one-half of a horizontal line. As such, the active video information of the first field 20 begins at the top left-hand corner of the television screen while the active video information of the second field 22 begins at the top center portion of the television screen.

Referring now to FIG. 2A, each horizontal line of video information within the active video portions 28 and 30 includes a plurality of time continuous components including a front porch 40, a horizontal sync pulse 42, a breezeway 44, and a back porch 46, all of which comprise horizontal synchronizing signals. Furthermore, each horizontal line within the active video portions 28 and 30 includes a time continuous color burst signal 48 and a time continuous active video signal 50.

Figure 2B:
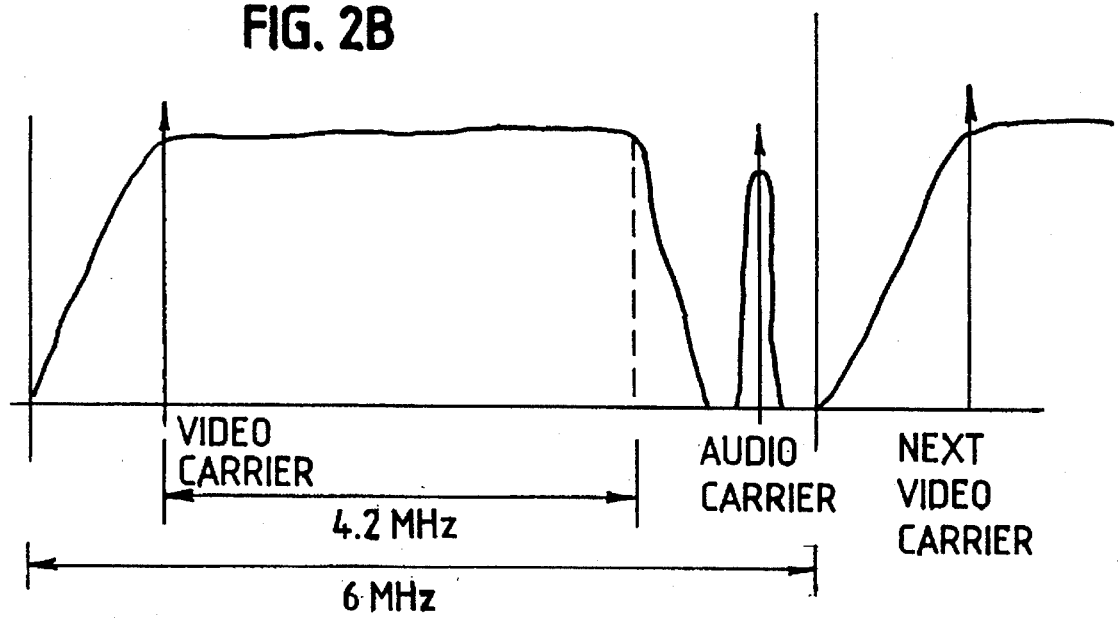
FIG. 2B is a frequency diagram representing the spectrum of a video channel which carries the video signal illustrated in FIG. 2A.

A typical video communications system is capable of transmitting multiple video signals through multiple channels, each of which has a predetermined bandwidth. The frequency spectrum of a typical video channel, which is illustrated in FIG. 2B, includes a video carrier which modulates a video signal and an audio carrier which modulates an audio signal associated with the video signal. As illustrated in FIG. 2B each channel is approximately 6 MHz in width so that the video carrier of each channel is spaced approximately 6 MHz from the video carriers of the adjacent channels. Furthermore, the modulated video signal associated with each channel has a bandwidth of approximately 4.2 MHz extending above the video carrier.

Generally, the scrambling system of the present invention eliminates the horizontal synchronizing signals, including the front porch, the horizontal sync pulse, the breezeway and the back porch, from each horizontal line of an original video signal and eliminates a number of the horizontal lines within the VBIs of each frame of the original video signal. The scrambling unit also samples the color burst signal and the active video signal within each horizontal line of the video signal at a first rate, which is an exact first multiple of the frequency of the color burst signal, and stores the sampled data in a first-in-first-out (FIFO) memory. The scrambling system then reads the sampled data out of the FIFO memory at a second and lower rate which is an exact second multiple of the frequency of the color burst signal, to time expand the stored video signal by a ratio of the first rate over the second rate. The time expanded video signal is then converted into an analog signal at the second rate to produce a scrambled video signal which, in turn, is transmitted through a channel using any conventional method, such as amplitude modulation.

Because the scrambled video signal is expanded in time and because certain horizontal sync information within each horizontal line of the scrambled video signal is removed prior to transmission of the scrambled video signal, it is difficult if not impossible to reconstruct the video signal from the scrambled video signal without a proper descrambling unit. As such, the picture content of the scrambled video signal is substantially masked.

Furthermore, because the scrambled video signal is expanded in time by the ratio of the first rate over the second rate, the spectrum of the scrambled video signal is reduced by the ratio of the second rate over the first rate thereby reducing the bandwidth of each channel of the video communications system. The spectrum vacated by this method may be used to transmit audio information associated with the video signal in digital form thus enabling the audio information to be encrypted according to any desired digital technique. Alternatively, the vacated spectrum can be used to increase the number of channels available in a fixed bandwidth communications system.

At a subscriber terminal, a descrambling unit samples the incoming scrambled video signal at the second rate and stores the digitized scrambled video signal in a FIFO memory. The descrambler unit then reads the digitized scrambled video signal out of the FIFO memory at the first rate to time compress the scrambled video signal. The descrambler also inserts the front porch, horizontal sync pulse, breezeway and back porch signals into the proper places in each horizontal line of the scrambled video signal and inserts any horizontal lines which may have been deleted from the VBIs of the original video signal to reconstruct the original video signal in digital form. The reconstructed digital video signal is then converted to analog to produce a reconstructed video signal which is a substantial equivalent to that of the original video signal.

The below-described scrambling system, which is provided by way of example only, digitizes an original video signal at a rate equal to six times the frequency of the color burst signal and transmits the digitized video samples at a rate equal to five times the frequency of the color burst signal. As such, in a conventional television transmission system wherein the frequency of the color burst signal is 3.58 MHz, each horizontal line of the original video signal is divided into 1365 discrete horizontal samples or pixels while each horizontal line of the scrambled video signal is divided into 1164 discrete horizontal samples or pixels. Furthermore, each frame of the original video signal includes 525 horizontal lines while each frame of the scrambled video signal includes 513 horizontal lines.

Furthermore, by way of example only, the below-described scrambling system removes the front porch, the horizontal sync pulse, the breezeway and the back porch from the horizontal blanking interval of each horizontal line and, moreover, removes the first six horizontal lines from each of the VBIs of the original video signal. It should be noted, however, that any other desired digitizing and transmitting rates can be used as long as the chosen rates are exact whole number multiples of the frequency of the color burst signal and the transmitting rate is lower than the digitizing rate. Furthermore, any other desired combination of signals can be removed from the active video portions or from the VBIs of an original video signal using this scrambling technique.

Figure 3A:
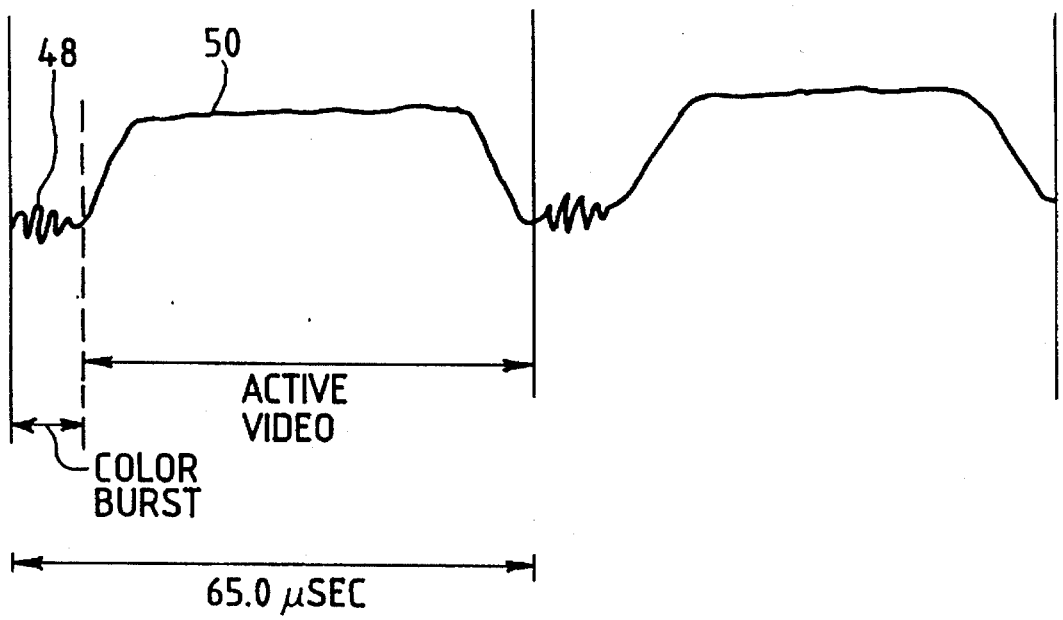
FIG. 3A is a timing diagram representing two horizontal lines of a video signal scrambled according to the technique of the present invention.

Referring now to FIG. 3A, a video signal which has been scrambled according to the technique of the present invention is illustrated. Each horizontal line of the scrambled video signal includes only the color burst signal 48 and the active video signal 50, both of which have been expanded in time by the ratio of 6/5. As a result, each horizontal line of the scrambled video signal is approximately 65.0 microseconds long. However, because there are only 513 horizontal lines in each frame of the scrambled video signal (instead of 525 lines) the frames of the scrambled video signal are approximately equal in length to the frames of the original video signal.

Figure 3B:
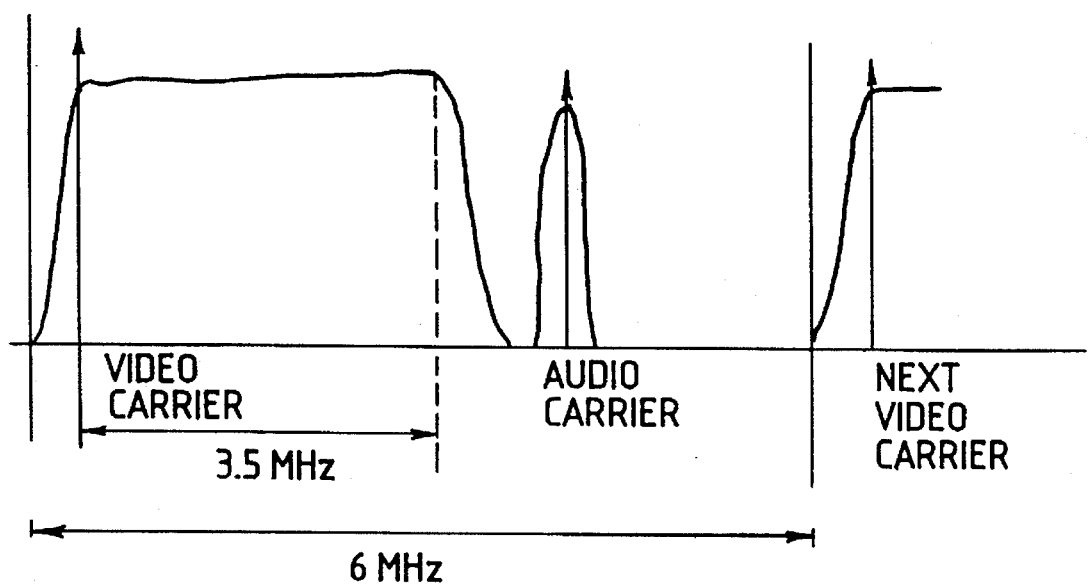
FIG. 3B is a frequency diagram representing the spectrum of a video channel which carries the video signal illustrated in FIG. 3A.

As illustrated in FIG. 3B, the bandwidth of the scrambled video signal, which is shown as modulating a carrier signal within a channel, is approximately 3.5 MHz and, therefore, has been reduced by the ratio of 5/6 as compared to the bandwidth of the original video signal illustrated in FIG. 2B. As a result, the audio carrier associated with each channel of the scrambling system can be located closer in frequency to the video carrier (as shown in FIG. 3B) which allows the channels to be narrower or which allows more spectral space for digitizing and encrypting the audio signal.

Figure 4:
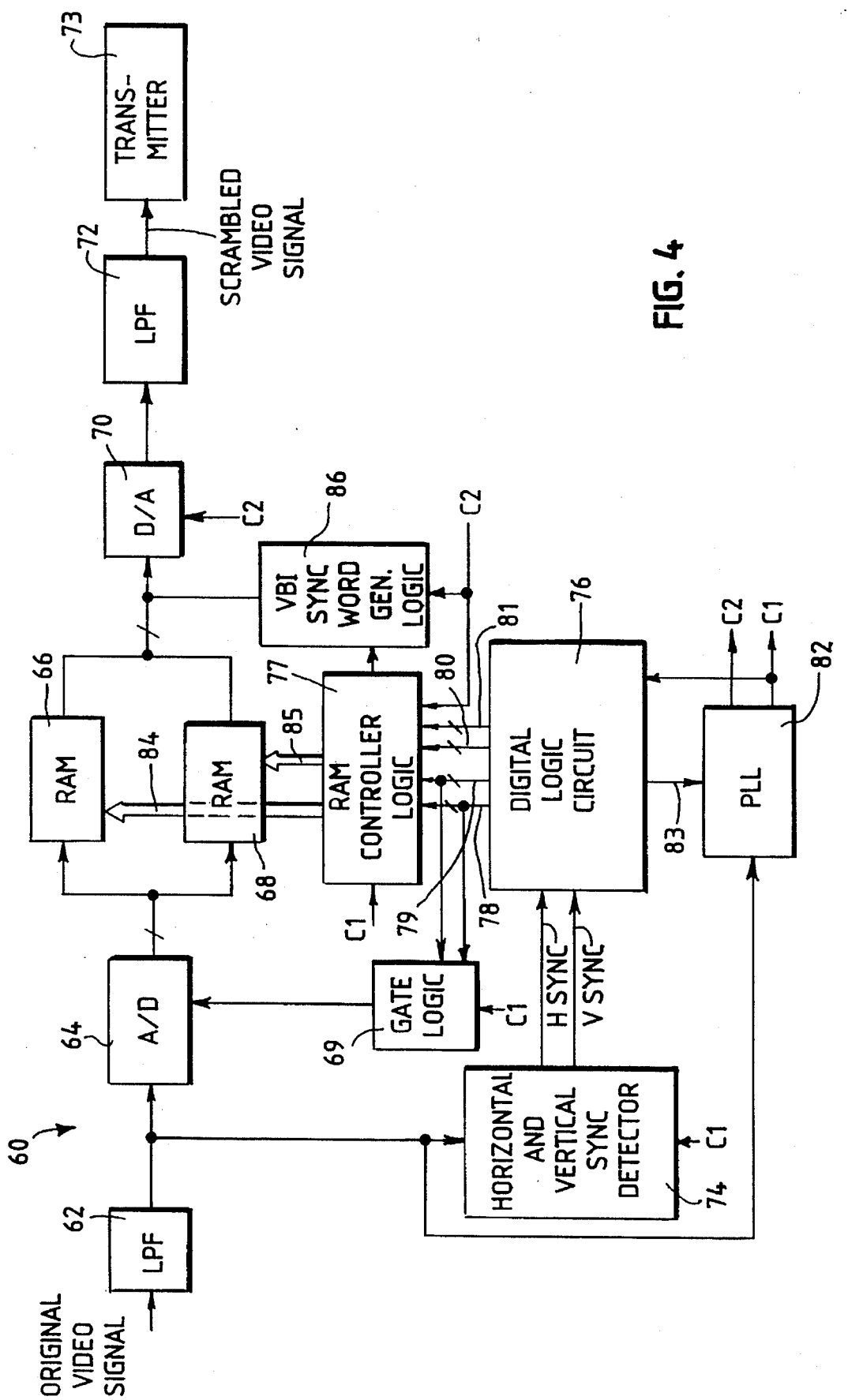
FIG. 4 is a block diagram illustrating a scrambling unit according to the present invention.

Referring now to FIG. 4, a scrambling unit 60 scrambles an original video signal according to the method of the present invention. The scrambling unit 60 includes a low pass filter (LPF) 62 having a bandwidth of 4.5 MHz which filters the original video signal and an A/D converter 64, preferably comprising a flash A/D converter. The A/D converter 64 samples the filtered original video signal at a first rate defined by a clock signal C1 which, in this example, has frequency equal to six times the frequency of the color burst signal within the original video signal. The A/D converter 64 produces a digital video signal having one or more sets of time contiguous video samples which is stored in one of a pair of random access memories (RAMs) 66 and 68.

The operation of the A/D converter 64 is controlled by a gate logic circuit 69 which enables the A/D converter 64 only during those portions of the VBIs 24 and 26 which are to be transmitted (i.e., the last 15 horizontal lines of each VBI) and during these portions of the horizontal lines of the original video signal which contain a color burst signal 48 or an active video signal 50. In this manner, the A/D converter 64 eliminates the first six lines of each VBI 24 and 26 and the front porch 40, the horizontal sync pulse 42, the breezeway 44 and the back porch 46 from each horizontal line of the original video signal.

Preferably, each of the RAMs 66 and 68 comprise a FIFO memory which is capable of storing one digitized frame of the original video signal therein. The RAMs 66 and 68 alternatively read data corresponding to a frame of the original video signal from the A/D converter 64 at the first rate and write data corresponding to a frame of the scrambled video signal to a D/A converter 70 at a second rate, corresponding to a clock signal C2, to develop a time expanded digital scrambled video signal. Thus, for example, when the RAM 66 has stored the digitized data corresponding to an entire frame of the original video signal, the RAM 66 begins to write the stored video signal out to the D/A converter 70 while the RAM 68 begins to read the next digitized frame of the original video signal developed by the A/D converter 64.

The D/A converter 70 is responsive to the clock signal C2 which, in this example, has a frequency equal to five times the frequency of the color burst signal of the original video signal, and produces an analog scrambled video signal that is a time expanded analog version of the video signal stored in one of the RAMs 66 or 68. The analog scrambled video signal is delivered to a LPF 72, preferably having a bandwidth equal to 3.5 MHz, which eliminates harmonics above 3.5 MHz therefrom. The LPF 72 is connected to a standard transmitter 73 which may modulate the filtered analog scrambled video signal onto a carrier and transmit the modulated video signal through a channel.

The operation of the RAMs 66 and 68 is controlled by a sync detector 74 in conjunction with a digital logic circuit 76 and a RAM controller logic circuit 77. The sync detector 74 detects horizontal sync and vertical sync pulses existing within the filtered original video signal present at the output of the LPF 62 and produces a pulse on an H-sync line in response to the horizontal sync pulse within the horizontal lines of the original video signal and produces a pulse on a V-sync line in response to one or more of the vertical sync pulses within the VBIs of the original video signal. The sync detector 74 may include an A/D converter which digitizes the filtered original video signal at a rate corresponding to the clock signal C1, a shift register, and/or a comparator which compares the contents of the shift register with predetermined digital signals to recognize horizontal and vertical sync pulses within the filtered original video signal.

The digital logic circuit 76 responds to the clock signals C1 and C2 and to the signals on the H-sync line and the V-sync line to develop a set of digital signals on digital buses 78 and 79 (which may be of any desired digital length, e.g., 4 bit, 6 bit or 8 bit). The digital signals on the buses 78 and 79 indicate the precise time position of each frame of the original video signal measured with respect to the output of the LPF 62. The digital logic circuit 76 also produces a set of digital signals on digital buses 80 and 81 (which also may be of any desired digital length) which indicate the precise time position of each frame of the digital scrambled video signal at the input of the D/A converter 70. Specifically, the digital logic circuit 76 produces digital signals on the digital bus 78 indicative of the number of the horizontal line within a particular frame of the original video signal which is present at the output of the LPF 62 and produces digital signals on the digital bus 79 indicative of the horizontal pixel within the particular horizontal line of the original video signal which is present at output of the LPF 62. Likewise, the digital logic circuit 76 produces digital signals on the bus 80 indicative of the horizontal line of the digital scrambled video signal being delivered to the input of the D/A converter 70 and produces digital signals on the bus 81 indicative of the horizontal pixel of the particular horizontal line of the digital scrambled video signal which is being delivered to the D/A converter 70.

The digital logic circuit 76 also develops a phase locked loop (PLL) enable signal which is delivered to a phase locked loop (PLL) circuit 82, via a line 83, whenever a color burst signal is present at the output of the LPF 62. The PLL 82 responds to the color burst information within the filtered video signal present at the output of the LPF 62 and to the PLL enable signal on the line 83 to produce the first and second clock signals C1 and C2, respectively.

The gate logic circuit 69 responds to the digital signals on the buses 78 and 79 and gates the first clock signal C1 to the A/D converter 64. Thus, when the digital signals on the bus 78 indicate that one of the first six horizontal lines within one of the VBIs is present at the output of the LPF 62, the gate logic circuit 69 disconnects the first clock signal C1 from the A/D converter 64 using, for example, an AND Gate, to prevent these horizontal lines of video from being digitized and stored in one of the RAMs 66 or 68. Likewise, when the digital signals on the bus 78 indicate that a horizontal line containing an active video signal is present at the output of the LPF 62 and when the digital signals on the bus 79 indicate that one of the front porch, the horizontal sync pulse, the breezeway or the back porch is present at the output of the LPF 62, the gate logic circuit 69 disconnects the first clock signal C1 from the A/D converter 64 to prevent those portions of each horizontal line from being digitized and stored in one of the RAMs 66 or 68.

The RAM controller 77 responds to the clock signal C1 and to the digital signals on the buses 78 and 79, and controls one of the RAMs 66 or 68, via control lines 84 or 85, respectively (which may be digital buses) to read the digitized video signal developed by the A/D converter 64 at a rate corresponding to the clock signal C1. It should be noted that the RAM controller 77 disables the reading operation of the RAMs 66 or 68 when the A/D converter 64 is disabled. The RAM controller 77 also responds to the clock signal C2 and to the signals on the lines 80 and 81, and controls the other of the RAMs 66 or 68 to write previously stored digital video signals out to the D/A converter 70 at a rate corresponding to the clock signal C2.

Preferably the RAM controller 77 controls the addressing and timing of the RAMs 66 and 68 using the digital signals on the buses 78–80. Thus the RAM controller 77 may control the RAMs 66 and 68 to read from the A/D converter 64 using the signal on the bus 78 to establish, synchronize or align the higher order addressing bits and using the signal on the bus 79 to establish, synchronize or align the lower order addressing bits. Likewise, the RAM controller 77 may control the RAMs 66 and 68 to write to the D/A converter 70 using the signal on the bus 80 to establish, synchronize or align the higher order addressing bits and using the signal on the bus 81 to establish, synchronize or align the lower order addressing bits. Although the above-described addressing scheme reduces complexity of the RAM controller 77 and provides for ease of addressing of the RAMs 66 and 68, any other desired addressing scheme can be used to control the reading and writing operations of the RAMs 66 and 68.

Because the vertical sync pulses and the horizontal sync signals are stripped from the original video signal to produce the scrambled video signal, it is necessary to place a synchronizing word or code into each frame of the scrambled video signal to enable a descrambler to sync up to the scrambled video signal. Thus, during one or more horizontal lines of one of the VBIs within each frame of the scrambled video signal, and preferably during the first horizontal line of each frame of the scrambled video signal, the RAM controller 77 disables the writing operation of the RAM 66 or 68 and enables a VBI sync word generator logic 86 which delivers a VBI sync word or a predetermined code to the input of the D/A converter 70. As a result, the predetermined code is inserted into the desired horizontal line of the scrambled video signal which enables a descrambler unit to sync up to the scrambled video signal and thereby to reconstruct the original video signal from the scrambled video signal.

The VBI sync word generator logic 86 may comprise a RAM or a ROM having a predetermined sync word stored therein and which, when enabled, sequentially writes the stored sync word out to the D/A converter 70. It should be noted that the predetermined code produced by the VBI sync word generator logic 86 can be changed periodically in order to provide a further level of security within the scrambling system.

It should be noted that, although the horizontal sync and VBI signals have been described as being stripped from the original video signal prior to digitization in the A/D converter 64, the horizontal sync signals and VBI signals can also be stripped from the original video signal within the scrambling unit 60 after such information has been digitized by the A/D converter 64 and/or stored in one of the RAMs 66 or 68. In such a configuration, the memories of the RAMs 66 and 68 would be larger and would store information which is not part of the scrambled video signal.

Figure 5:
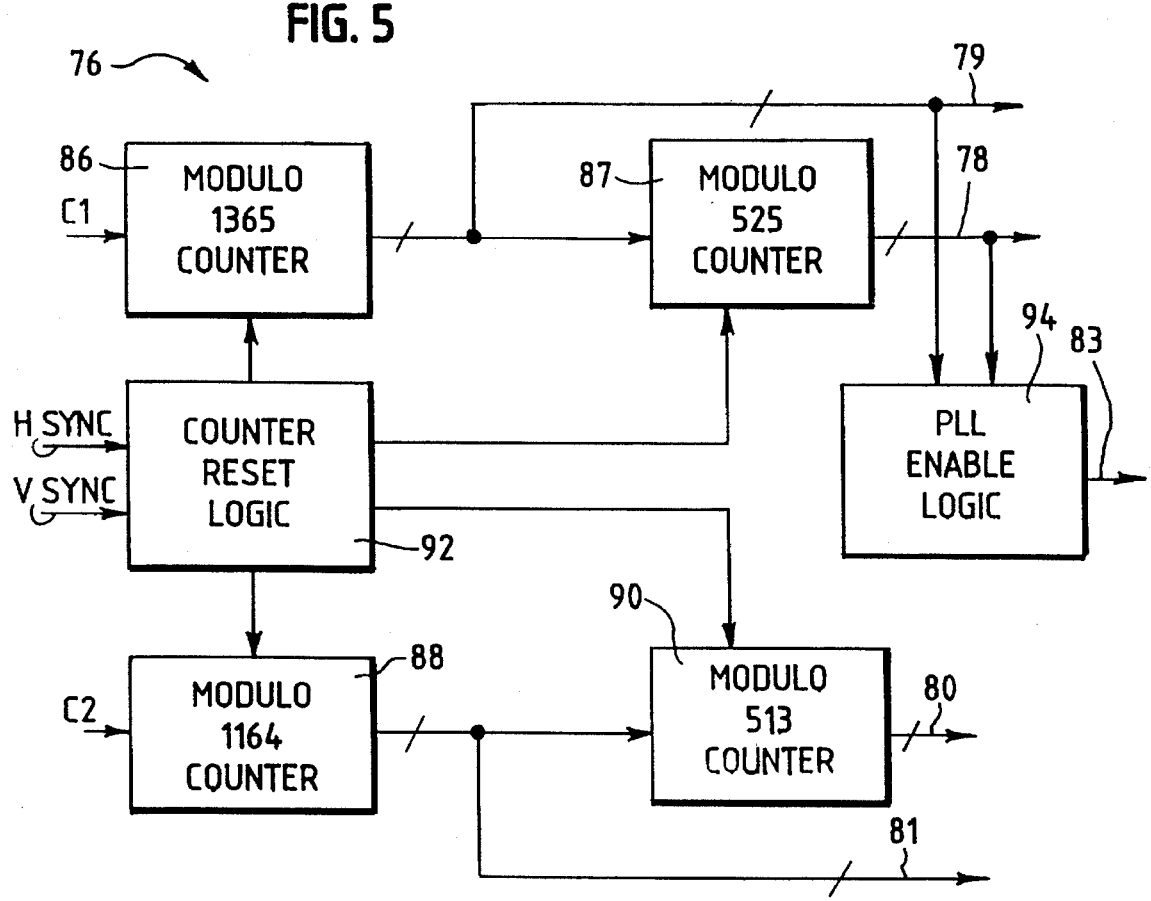
FIG. 5 is a block diagram illustrating the digital logic circuit shown in FIG. 4.

Referring now to FIG. 5, the digital logic circuit 76 includes a modulo-1365 counter 86 which responds to the clock signal C1 and produces digital signals indicative of the pixel number within the particular horizontal line of the original video signal present at the output of the LPF 62. These digital signals are delivered to the RAM controller 77 via the bus 79 and are also delivered to a modulo-525 counter 87 which advances whenever the output of the modulo-1365 counter 86 resets to zero (or any other predetermined count). The modulo-525 counter 87 produces digital signals indicative of the horizontal line number of a particular frame of the original video signal which is present at the output of the LPF 62 and delivers these signals to the RAM controller 77 via the bus 78.

The digital logic circuit 76 also includes a modulo-1164 counter 88 which responds to the clock signal C2 and produces digital signals indicative of the pixel number within the particular horizontal line of the scrambled video signal present at the input of the D/A converter 70. These digital signals are delivered to the RAM controller 77 via the bus 81 and are also delivered to a modulo-513 counter 90 which advances whenever the output of the modulo-1164 counter 88 resets to zero (or any other predetermined count). The modulo-513 counter 90 produces digital signals indicative of the horizontal line number of a particular frame of the scrambled video signal present at the input of the D/A converter 70 and delivers these signals to the RAM controller 77 via the bus 80.

A counter reset logic circuit 92 responds to the signals present on the H-sync and the V-sync lines to reset the counters 86 and 87 in order to keep the counters 86 and 87 synchronized and properly aligned with the original video signal. The counter reset logic circuit 92 also resets the counters 88 and 90 to keep the scrambled video signal developed by the scrambling unit 60 synchronized with the original video signal. Thus, for example, the counter reset logic circuit 92 may respond to the leading edge of a pulse on the H-sync line (which indicates that a horizontal sync pulse is present at the output of the LPF 62) to reset the modulo-1365 counter 86 to the count representing the first pixel of a horizontal sync pulse within a horizontal line of the original video signal. Simultaneously, the counter reset logic circuit 92 may advance the modulo-525 counter 87 to indicate the next horizontal line. Likewise, the counter reset logic circuit 92 may respond to the leading edge of a pulse on the V-sync line (which indicates that a vertical sync pulse is present at the output of the LPF 62) to reset the modulo-525 counter 87 to a count representing the horizontal line within a frame of the original video signal which includes a vertical sync pulse. Furthermore, the counter reset logic circuit 92 may reset the modulo-1164 counter 88 and the modulo-513 counter 90 when, for example, a pulse on the V-sync line indicates that a new frame of the video signal is being delivered to the scrambling unit 60.

In this manner, the counter reset logic circuit 92 enables the scrambling unit 60 to sync up to the incoming video signal when the scrambling unit 60 is first turned on. The counter reset logic circuit 92 also enables the scrambling unit 60 to compensate for timing errors created by digitization of the original video signal. This operation is necessary because, as noted before, the scrambling unit 60 divides each frame of the original video signal into 1365 pixels and 525 horizontal lines, which leaves approximately 111 pixels unaccounted for at the end of each frame of the video signal. The counter reset logic circuit 92 compensates for these extra pixels by keeping the pixel count of each horizontal line on the line 79 in sync with the horizontal sync pulse of the original video signal and by keeping the horizontal line count on the line 78 in sync with the vertical sync pulse.

The digital logic circuit 76 also includes a PLL enable logic circuit 94 which responds to the signals on the buses 78 and 79 to produce the PLL enable signal on the line 83 whenever color burst information is present at the input of the A/D converter 64. The PLL enable logic circuit 94 may comprise a comparator which compares the digital signals on the buses 78 and 79 with known values to recognize when color burst information is present in the original video signal. Thus, when the digital signals on the bus 78 indicate that a horizontal line containing a color burst signal is present at the input of the A/D converter 64 and the digital signals on the bus 79 indicate that a pixel within the horizontal line contains color burst information, the PLL enable logic circuit 94 places a PLL enable logic signal onto the line 83 to be used by the PLL 82.

Figure 6:
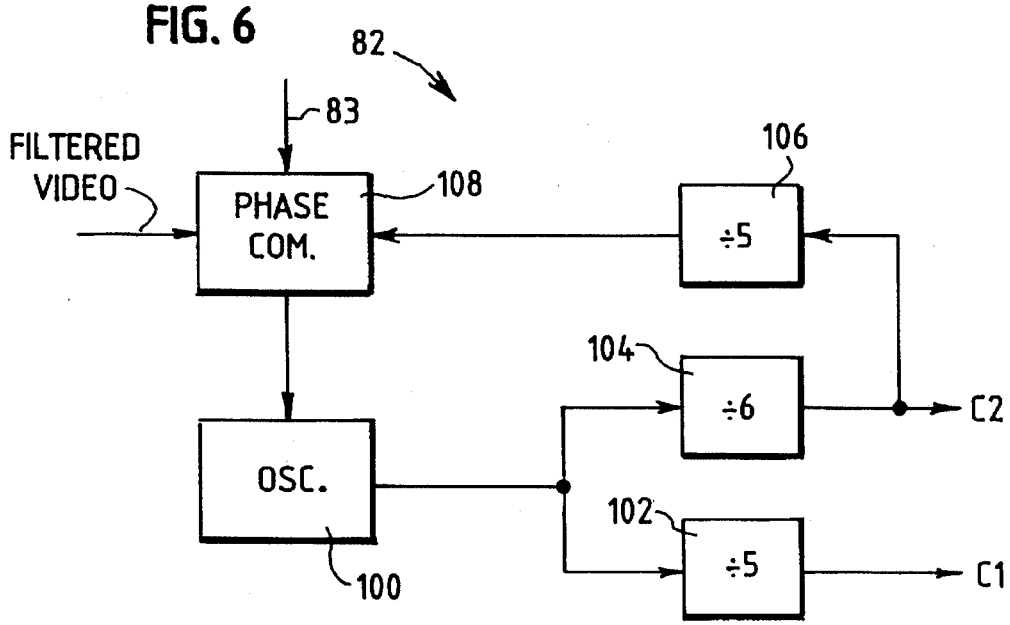
FIG. 6 is a block diagram illustrating the phase locked loop shown in FIG. 4.

Referring now to FIG. 6, the PLL 82 includes an oscillator 100 which oscillates at a rate equal to the first multiple of the frequency of the color burst signal times the second multiple of the frequency of the color burst signal which, in the preferred embodiment, is 30 times the frequency of the color burst signal or approximately 107.4 MHz. A divider circuit 102 divides the output of the oscillator 100 by five to produce the clock signal C1 which, as noted before, has a frequency equal to six times the frequency of the color burst signal. Likewise, a divider circuit 104 divides the output of the oscillator 100 by six to produce the clock signal C2 which, as noted before, has a frequency equal to five times the frequency of the color burst signal.

A further divider circuit 106 divides the clock signal C2 by five and delivers a signal having a frequency equal to the frequency of the color burst signal to a phase comparator 108. The phase comparator 108 compares the phase of the signal developed by the divider circuit 106 with the phase of the filtered video signal produced by the LPF 62 and delivers an error signal indicative of the phase difference therebetween to the oscillator 100. The phase comparator 108, however, only operates when the PLL enable signal (color burst gate) is present on the line 83 and, thereby, only operates when a color burst signal is present at the output of the LPF 62. When the PLL enable signal is not present on the line 83, which indicates that a color burst signal is not present at the output of the LPF 62, the error signal output by the phase comparator 108 is zero.

As is typical in a phase locked loop configuration, the oscillator 100 responds to the error signal developed by the phase comparator 108 and adjusts the frequency of the signal delivered to the divider circuits 102 and 104 in manner which drives the error signal to zero. As a result, the output of the oscillator 100 is phase locked to the color burst signal present in the original video signal.

Figure 7:
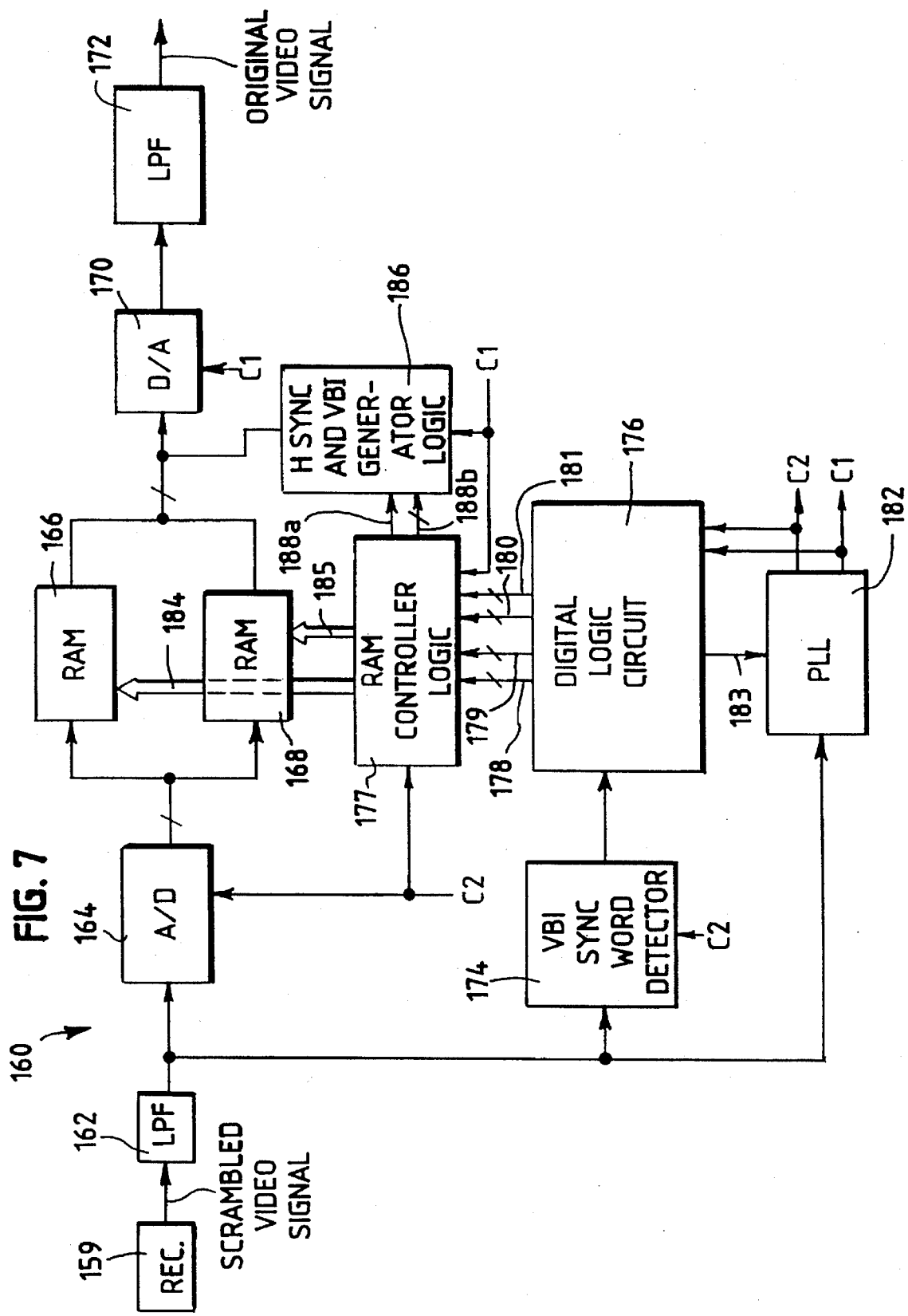
FIG. 7 is a block diagram illustrating a descrambling unit according to the present invention.

Referring now to FIG. 7, a receiver 159 receives and demodulates the scrambled video signal developed by the scrambling unit 60 and delivers it to a descrambling unit 160. The descrambling unit 160 is similar to the scrambling unit 60 with components being numbered 100 greater than the corresponding components of the scrambling unit 60. Thus, the descrambling unit 160 includes a LPF 162 having a bandwidth of approximately 3.5 MHz which low pass filters the scrambled video signal to reduce harmonics and to prevent aliasing within the descrambling unit 160. The LPF 162 delivers the filtered scrambled video signal to an A/D converter 164 which digitizes the filtered scrambled video signal at a rate determined by a clock signal C2 which has a frequency equal to the frequency of the clock signal C2 of the scrambling unit 60. The A/D converter 164 develops a digital scrambled video signal which is stored in one of two RAMs 166 or 168 at the rate determined by the clock signal C2. Meanwhile, a previously stored frame of the digital scrambled video signal is read out of the other of the RAMs 166 or 168 at a rate corresponding to a clock signal C1, which has a frequency equal to the frequency of the clock signal C1 of the scrambling unit 60, to produce a digital video signal which is delivered to a D/A converter 170. The D/A converter 170 transforms the digital video signal into an analog signal at the rate corresponding to the clock signal C1 so that the analog video signal has a bandwidth substantially equal to the bandwidth of the original video signal. The analog video signal is delivered to a LPF 172 having a bandwidth of 4.5 MHz which develops a reconstructed video signal that is a substantial equivalent of the original video signal.

The descrambling unit 160 also includes a VBI sync word detector 174 which recognizes the VBI sync word or predetermined code inserted into each frame of the scrambled video signal. The VBI sync word detector 174 may include an A/D converter (such as a comparator) which digitizes the scrambled video signal at a rate corresponding to the clock signal C2 and which places the digitized data into a shift register. The contents of the shift register are compared to a stored version of the VBI sync word currently being used in the system to determine the beginning of each frame of the incoming scrambled video signal. When the VBI sync word detector 174 recognizes a sync word, it delivers a pulse signal to a digital logic circuit 176.

The digital logic circuit 176 responds to the pulse signal developed by the VBI sync word detector 174 and to the clock signals C1 and C2 and produces a set of digital signals on digital buses 178 and 179 which are indicative of the horizontal line number and the horizontal pixel number within each frame of the scrambled video signal present at the output of the LPF 162. The digital logic circuit 176 also develops a set of digital signals on digital buses 180 and 181 indicative of the horizontal line number and the horizontal pixel number within each frame of the video signal present at the input of the D/A converter 170.

Similar to the digital logic circuit 76 of the scrambling unit 60, the digital logic circuit 176 develops a PLL enable signal which is delivered to a phase locked loop (PLL) circuit 182 via a line 183 whenever a color burst signal is present at the output of the LPF 162. The PLL 182 responds to the filtered scrambled video signal at the output of the LPF 162 and to the PLL enable signal on the line 183 to produce the clock signals C1 and C2.

A RAM controller logic 177 is responsive to the signals on the buses 178–181 and to the clock signals C1 and C2 and controls one of the RAMs 166 or 168, via control lines 184 or 185, respectively, to read the digital scrambled video signal developed by the A/D converter 164 at a rate corresponding to the clock signal C2 and controls the other of the RAMS 166 or 168 to write a previously stored digital scrambled video signal to the D/A converter 170 at a rate corresponding to the clock signal C1. When the signals on the buses 178, 179, 180 and/or 181 indicate that a new frame of the scrambled video signal is being delivered to the descrambling unit 160, the RAM controller logic 177 switches the reading and writing operations of the RAMs 166 and 168.

The RAM controller 177 disables the writing operation of the RAMs 166 and 168 whenever the timing signals on the buses 180 and/or 181 indicate that a horizontal sync signal or a VBI signal is missing from the stored digital scrambled video signal. Simultaneously the RAM controller 177 enables an H-sync and VBI generator logic circuit 186 which delivers a replica of the appropriate horizontal sync or VBI signal to the input of the D/A converter 170 at a rate corresponding to the clock signal C1. Thus, for example, when the timing signal on the bus 181 indicates that a front porch signal, a horizontal sync pulse, a breezeway signal or a back porch signal should be added to the scrambled video signal to produce the original video signal, the RAM controller 177 enables the generator 186, via the lines 188a and 188b, to deliver a digital replica of the appropriate signal to the input of the D/A converter 170. Simultaneously, the RAM controller 177 disables the writing operation of the RAM 166 or 168. Likewise, when the signal on the line 180 indicates that a horizontal line within the VBI should be reinserted into the scrambled video signal to reconstruct the original video signal, the RAM controller 177 disables the writing operation of the RAM 166 or 168 and enables the generator logic circuit 186 to deliver a replica of the appropriate horizontal line of the original video signal to the input of the D/A converter 170.

The H-sync and VBI generator logic 186 may be a ROM which stores digital versions of the front porch signal, the horizontal sync pulse, the breezeway signal and the back porch signal. When enabled via, for example, the line 188*a*, the H-sync and VBI generator 186 delivers the signal to be reproduced as indicated by, for example, the digital signal or address on the line 188*b*, to the input of the D/A converter 170 at a rate corresponding to the clock signal C1.

Figure 8:
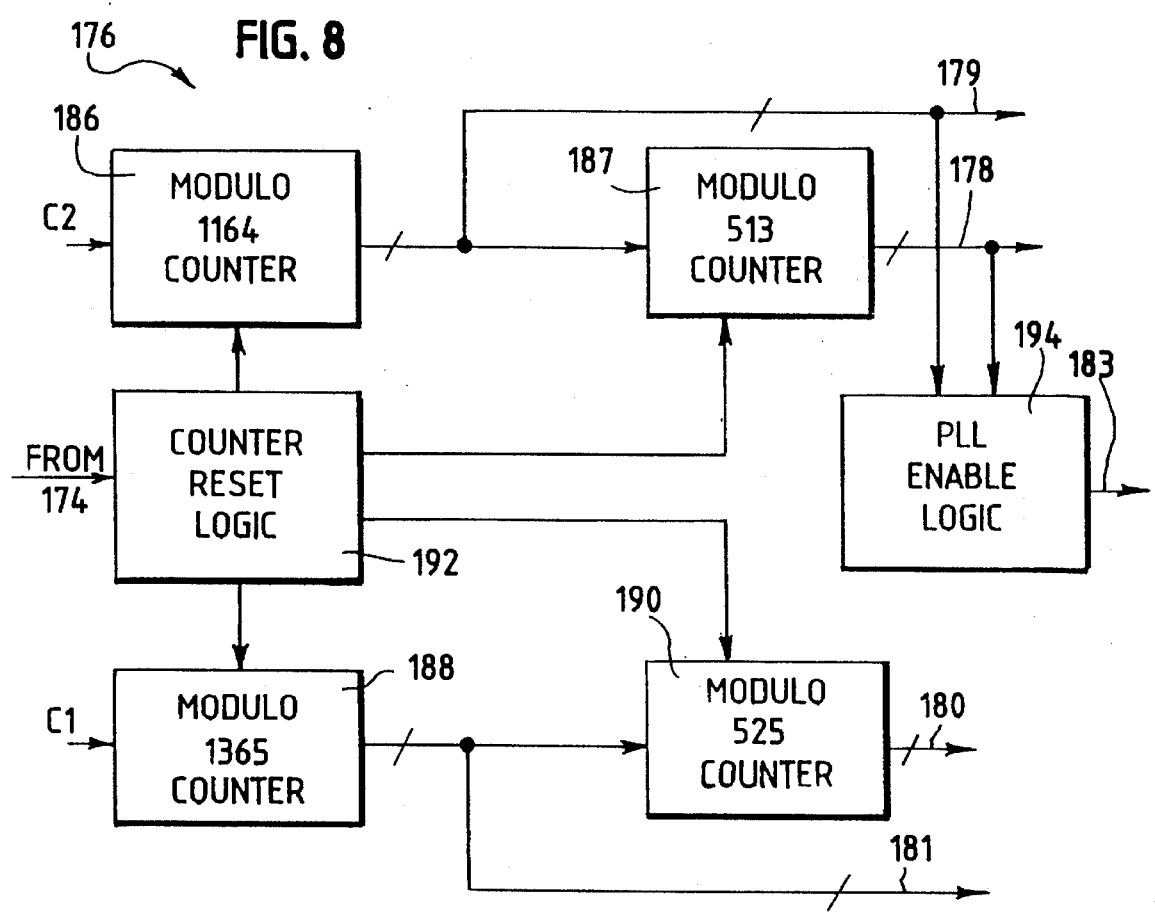
FIG. 8 is a block diagram illustrating the digital logic circuit shown in FIG. 7.

Referring now to FIG. 8, the digital logic circuit 176 includes a modulo-1164 counter 186 which responds to the clock signal C2 to produce digital signals indicative of the pixel within the particular horizontal line of the scrambled video signal present at the output of the LPF 162. These digital signals are delivered to the RAM controller 177 via the bus 179 and are also delivered to a modulo-513 counter 187 which advances whenever the output of the modulo-1164 counter 186 resets to zero (or any other predetermined count). The modulo-513 counter 187 produces digital signals indicative of the horizontal line number of a particular frame of the scrambled video signal present at the output of the LPF 162 and delivers these signals to the RAM controller 177 via the bus 178.

The digital logic circuit 176 also includes a modulo-1365 counter 188 which responds to the clock signal C1 to produce digital signals indicative of the pixel number within the particular horizontal line of the digital video signal present at the input of the D/A converter 170. These digital signals are delivered to the RAM controller 177 via the bus 181 and are also delivered to a modulo-525 counter 190 which advances whenever the output of the modulo-1365 counter 188 resets to zero (or any other predetermined count). The modulo-525 counter 190 produces digital signals indicative of the horizontal line of a particular frame of the digital video signal present at the input of the D/A converter 170 and delivers these signals to the RAM controller 177 via the bus 180.

The digital logic circuit 176 also includes a counter reset logic circuit 192 which responds to the signal produced by the VBI sync word detector 174 to reset the counters 186 and 187 in order to keep the counters 186 and 187 synchronized (aligned) with the scrambled video signal being delivered to the descrambling unit 160. The counter reset logic circuit 192 also resets the counters 188 and 190 in order to keep each frame of the reconstructed video signal, developed by the descrambling unit 160, synchronized with a frame of the scrambled video signal being delivered to the descrambling unit 160. Thus, when the counter reset logic circuit 192 receives a pulse signal from the VBI word detector 174, indicating that a new frame of the scrambled video signal is beginning, the counter reset logic circuit 192 resets the counters 186, 187, 188 and 190 which, in turn, causes the RAM controller 177 to switch the reading and writing operations of the RAMs 166 and 168. In this manner, the counter reset logic circuit 192 enables the descrambling unit 160 to sync up to the incoming scrambled video signal when the descrambling unit 160 is first turned on or when the scrambled signal being received is interrupted, and enables the descrambling unit 160 to compensate for any timing mismatches between the incoming scrambled video signal and the reconstructed video signal developed by the descrambling unit 160.

The digital logic circuit 176 also includes a PLL enable logic circuit 194, which may comprise a comparator, which compares the digital signals on the buses 178 and 179 with known values to recognize when a color burst signal is present within the scrambled video signal. Thus, for example, when the digital signals present on the bus 178 indicate that a horizontal line containing a color burst signal is present at the output of the LPF 162 and the digital signals on the bus 179 indicate that a pixel within the horizontal line contains color burst information, the PLL enable logic circuit 194 places a PLL enable logic signal onto the line 183.

Figure 9:
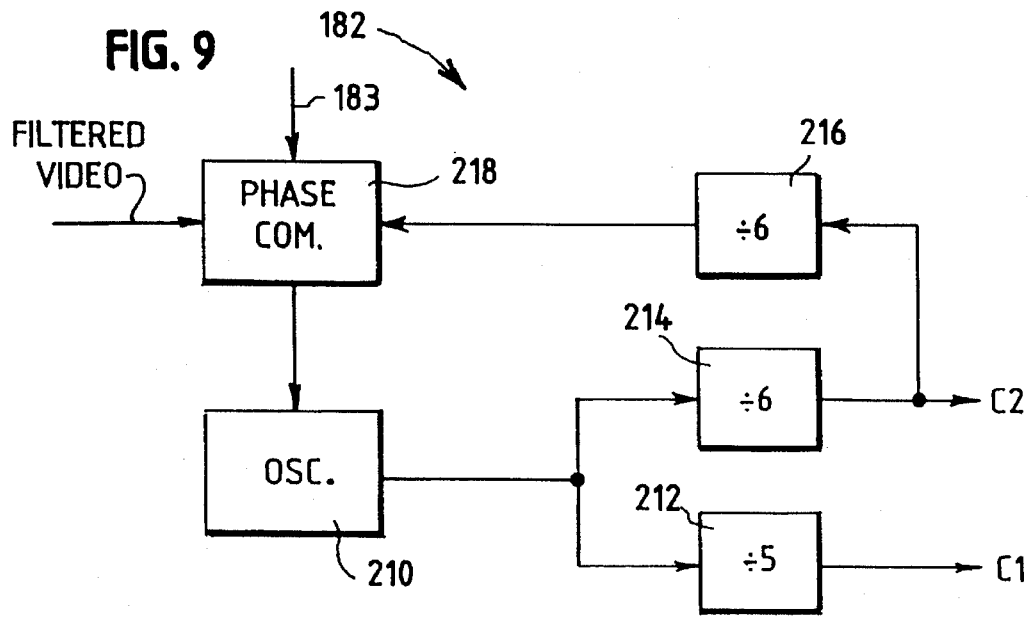
FIG. 9 is a block diagram illustrating the phase locked loop shown in FIG. 7.

Referring now to FIG. 9, the PLL 182 includes an oscillator 210 which oscillates at approximately the same rate as the oscillator 110 of the scrambling unit 60. As noted before, in the preferred embodiment, the oscillator 210 produces a signal having a frequency equal to 30 times the frequency of the color burst signal within the original video signal. A divider circuit 212 divides the output of the oscillator 210 by five in order to produce the clock signal C1 which, as noted before, has a frequency equal to six times the frequency of the color burst signal within the original video signal. Likewise, a divider circuit 214 divides the output of the oscillator 210 by six to produce the clock signal C2 which has a frequency equal to five times the frequency of the color subcarrier within the original video signal.

A further divider circuit 216 divides the clock signal C2 by six to produce a signal having a frequency which is equal to ⅚ of the frequency of the color burst signal within the original video signal and which, thereby, is equal to the frequency of the color burst signal within the scrambled video signal being delivered to the scrambling unit 160. A phase comparator 218 compares the phase of the signal output by the divider circuit 216 with that of the filtered scrambled video signal output by the LPF 162 to produce an error signal indicative of the phase difference therebetween. However, the phase comparator 218 only performs a comparing operation when the PLL enable signal is present on the line 183 which indicates that color burst information is present within the scrambled video signal. When the PLL enable signal is not present on the line 183, the phase comparator 218 produces a zero error signal.

As is typical in a phase locked loop configuration, the oscillator 210 responds to the error signal developed by the phase comparator 218 and adjusts the frequency of the signal delivered to the dividers 212 and 214 in a manner which drives the error signal to zero. As a result, the oscillator 210 is phase locked to the color burst signal present in the scrambled video signal and, consequently, to the color burst signal within the original video signal. Thus, the PLL 182 enables the descrambling unit 160 to operate synchronously with the scrambling unit 60 because both are synchronized to the color burst signal present within the original video signal. As a result, the clock signals C1 and C2 developed by the descrambling unit 160 have a frequency which is equal to the frequency of the clock signals C1 and C2, respectively, developed by the scrambling unit 60, even if the oscillators 110 and 210 are slightly mismatched.

It should be noted that, although the above-described embodiment has been illustrated as having the horizontal sync and vertical blanking information reinserted into the digital video signal at the output of the RAMs 166 and 168, this same information could, instead, be inserted into the digital scrambled video signal before the digital scrambled video signal is stored in the RAM 166 or 168 or after the digital scrambled video signal has been converted by the D/A converter 170 into an analog signal. Furthermore, any known circuitry including microprocessors can be used in the digital logic circuits 76, 176 and the RAM controllers 77 and 177.

The foregoing detailed description has been given for clearness of understanding only, and no unnecessary limitations should be understood therefrom, as modifications will be obvious to those skilled in the art.

We claim:

1. An apparatus for scrambling a video signal having first and second components, each component including at least one time continuous signal element, the apparatus comprising:

eliminating means for eliminating the first component from the video signal;

sampling means for sampling the second component to produce a plurality of time contiguous video samples;

expanding means connected to the sampling means for time expanding the plurality of time contiguous video samples to produce a time expanded digital scrambled video signal; and converting means for converting the time expanded digital scrambled video signal into an analog scrambled video signal.

2. The apparatus of claim 1 wherein the sampling means samples the second component at a first rate and wherein the expanding means includes storing means for storing the plurality of time contiguous video samples at the first rate and retrieving means for retrieving the plurality of time contiguous video samples from the storing means at a second rate, wherein the second rate is less than the first rate.

3. The apparatus of claim 2 wherein the second component of the video signal includes a color burst signal, wherein the apparatus further includes producing means responsive to the color burst signal for producing first and second clock signals at the first and second rates, respectively, and wherein the sampling means is responsive to the first clock signal and the converting means is responsive to the second clock signal.

4. The apparatus of claim 2 wherein the storing means includes a digital memory device.

5. The apparatus of claim 4 wherein the video signal includes a color burst signal and wherein the first and second rates are multiples of the frequency of the color burst signal.

6. The apparatus of claim 5 wherein the sampling means includes an analog to digital converter and the converting means includes a digital to analog converter.

7. The apparatus of claim 1 wherein the second component includes an active video signal.

8. The apparatus of claim 7 wherein the second component includes a color burst signal.

9. The apparatus of claim 1 wherein the first component includes a vertical blanking interval signal.

10. The apparatus of claim 9 wherein the first component includes a horizontal synchronizing signal.

11. The apparatus of claim 1 wherein the video signal includes a plurality of horizontal lines, each horizontal line having the first and second components and wherein the eliminating means includes means for eliminating the first component from each horizontal line and the sampling means samples the second component of each horizontal line to produce the plurality of time contiguous video samples.

12. The apparatus of claim 11 wherein the first component includes a horizontal synchronizing signal.

13. The apparatus of claim 12 wherein the second component includes an active video signal.

14. The apparatus of claim 1 further including means for inserting a predetermined code into the time expanded digital scrambled video signal before the converting means converts the time expanded digital scrambled video signal into the analog scrambled video signal.

15. An apparatus for scrambling a video signal including a vertical blanking interval component, a horizontal synchronizing component, a color burst component and an active video component, comprising:

an analog to digital converter which samples at least one of the components at a first rate and which converts the sampled component into a digital video signal;

a digital memory which stores the digital video signal at the first rate;

means for reading the stored digital video signal out of the digital memory at a second rate which is less than the first rate to produce a digital scrambled video signal; and a digital to analog converter which converts the digital scrambled video signal into an analog scrambled video signal at the second rate.

16. The apparatus of claim 15, further including a detector which detects at least one of the components of the video signal and wherein at least one of the analog to digital converter and the digital memory is responsive to the detector.

17. The apparatus of claim 16, further including a code word generator which inserts a predetermined code into the digital scrambled video signal.

18. The apparatus of claim 17, further including a phase lock loop which is responsive to the color burst component of the video signal and produces first and second clock signals at the first and second rates, respectively.

19. The apparatus of claim 15, wherein the ratio of the first rate to the second rate is approximately six to five.

20. An apparatus for descrambling a scrambled video signal to produce a replica of an original video signal having first and second components, each component including at least one time continuous element, wherein the scrambled video signal is a version of the original video signal in which the first component has been eliminated and the second component has been expanded in time by an expansion rate, the apparatus comprising;

sampling means for sampling the scrambled video signal to produce a digital scrambled video signal;

compressing means for time compressing the digital scrambled video signal by a compression rate dependent on the expansion rate to produce a digital video signal;

converting means for converting the digital video signal into an analog video signal; and inserting means coupled to the converting means for inserting a replica of the first component into one of the digital video signal and the analog video signal to produce the replica of the original video signal.

21. The apparatus of claim 20 wherein the second component of the original video signal has been expanded in time by the ratio of a first rate over a second rate which is less than the first rate, to produce the scrambled video signal, wherein the sampling means includes an analog to digital converter which samples the scrambled video signal at the second rate to produce the digital scrambled video signal and wherein the compressing means includes a memory which stores the digital scrambled video signal at the second rate and which writes the stored digital scrambled video signal out at the first rate to produce the digital video signal.

22. The apparatus of claim 21 wherein the original video signal has a color burst signal and wherein the first and second rates are multiples of the frequency of the color burst signal.

23. The apparatus of claim 21 wherein the converting means is a digital to analog converter.

24. The apparatus of claim 21 wherein the second component includes an active video signal.

25. The apparatus of claim 21 wherein the first component includes one of a vertical blanking interval signal and a horizontal synchronizing signal.

26. The apparatus of claim 21, wherein the scrambled video signal includes a plurality of frames, each of which includes a predetermined code and wherein the apparatus further includes a code detector which detects the predetermined code within the scrambled video signal and means responsive to the code detector for aligning a frame of the analog video signal with a frame of the scrambled video signal.

27. The apparatus of claim 26, further including a phase lock loop which responds to a component of the video signal which includes a color burst signal to produce first and second clock signals at the first and second rates, respectively.

28. A method for scrambling a video signal having first and second time continuous components, the method comprising the steps of:

eliminating the first time continuous component from the video signal;

sampling the second time continuous component to produce a plurality of time contiguous video samples;

time expanding the plurality of time contiguous video samples to produce a time expanded digital scrambled video signal; and converting the time expanded digital scrambled signal into an analog scrambled video signal.

29. The method of claim 28 wherein the step of sampling includes the step of sampling the second time continuous component at a first rate and wherein the step of expanding includes the steps of storing the plurality of time contiguous video samples at the first rate and retrieving the plurality of time contiguous video samples at a second rate which is less than the first rate.

30. The method of claim 29 further including the step of inserting a predetermined code into the time expanded digital scrambled video signal.

31. The method of claim 30 further including the step of deriving first and second clock signals having frequencies at the first and second rates, respectively, using a phase lock loop, wherein the second time continuous component includes a color burst signal and wherein the phase lock loop is responsive to the color burst signal.

32. A method for descrambling a scrambled video signal to produce a replica of an original video signal having first and second time continuous components, wherein the scrambled video signal is a version of the original video signal in which the first time continuous component has been eliminated and the second time continuous component has been expanded in time by an expansion rate, the method comprising the steps of:

sampling the scrambled video signal to produce a digital scrambled video signal;

time compressing the digital scrambled video signal by a compression rate dependent on the expansion rate to produce a digital video signal;

converting the digital video signal into an analog video signal; and inserting a replica of the first component into one of the digital video signal and the analog video signal to produce the replica of the original video signal.

33. The method of claim 32 wherein the scrambled video signal has been time expanded by a ratio of a first rate over a second rate which is less than the first rate, wherein the step of sampling includes the step of sampling the scrambled video signal at the second rate and wherein the step of compressing includes the steps of storing the digital scrambled video signal at the second rate and retrieving the digital scrambled video signal at the first rate to produce the digital video signal.

34. The method of claim 33 wherein the scrambled video signal includes a plurality of frames, each of which has a predetermined code therein, and wherein the method further includes the steps of detecting the predetermined code within the scrambled video signal and aligning a frame of the analog video signal with the a frame of the scrambled video signal.

35. The method of claim 34 wherein the scrambled video signal includes a color burst component and wherein the method further includes the step of producing first and second clock signals at the first and second rates, respectively, using a phase lock loop which is locked to the color burst component of the scrambled video signal.

36. An apparatus for transmitting a video signal having first and second time continuous components, comprising:

eliminating means for eliminating the first time continuous component from the video signal;

first sampling means for sampling the second time continuous component at a first rate to produce a plurality of time contiguous video samples;

expanding means connected to the sampling means for time expanding the plurality of time contiguous video samples by an expansion rate to produce a time expanded digital scrambled video signal;

first converting means for converting the time expanded digital scrambled video signal into an analog scrambled video signal at a second rate which is less than the first rate;

transmitting means for transmitting the analog scrambled video signal;

receiving means for receiving the transmitted analog scrambled video signal;

second sampling means connected to the receiving means for sampling the received analog scrambled video signal at the second rate to produce a digital scrambled video signal;

compressing means for time compressing the digital scrambled video signal by a compression rate dependent on the expansion rate to produce a time compressed digital video signal;

second converting means for converting the time compressed digital video signal into an analog video signal at the first rate; and inserting means for inserting a replica of the first component into one of the time compressed digital video signal and the analog video signal to produce the video signal.

37. The apparatus of claim 36 wherein the expanding means includes first storing means for storing the plurality of time contiguous video samples at the first rate and retrieving means for retrieving the plurality of time contiguous video samples at the second rate and wherein the compressing means includes a second storing means for storing the digital scrambled video signal at the second rate and a second retrieving means for retrieving the digital scrambled video signal at the first rate to produce the time compressed digital video signal.

\* \* \* \* \*